United States Patent [19]
DeLand et al.

[11] Patent Number: 5,853,018
[45] Date of Patent: Dec. 29, 1998

[54] DAMPENING RESONANCE IN A FLOW REGULATOR

[75] Inventors: Daniel L. DeLand, Davison; Gerrit V. Beneker, Algonac; Barbara J. Erickson, Holly; Charles A. Detweiler, Durand, all of Mich.

[73] Assignee: Eaton Corporation, Cleveland, Ohio

[21] Appl. No.: 808,557

[22] Filed: Feb. 28, 1997

[51] Int. Cl.[6] .......................... F16K 31/40; F02M 33/02
[52] U.S. Cl. .......................... 137/15; 123/158; 123/518; 123/520; 92/143; 251/30.02; 251/45; 251/64
[58] Field of Search ............................. 251/30.01, 30.02, 251/30.03, 30.04, 30.05, 45, 46, 64; 137/15; 92/143; 123/458, 518, 519, 520

[56] References Cited

U.S. PATENT DOCUMENTS

| | | | |
|---|---|---|---|
| 2,318,721 | 5/1943 | Siver | 92/143 |
| 3,857,401 | 12/1974 | Khanin | 137/1 |
| 3,926,204 | 12/1975 | Earl | 137/116.5 |
| 4,450,863 | 5/1984 | Brown | 137/614.11 |
| 4,500,067 | 2/1985 | Zukausky | 251/45 |
| 4,715,396 | 12/1987 | Fox | 251/30.02 |
| 4,844,112 | 7/1989 | Pick et al. | 137/15 |
| 5,082,240 | 1/1992 | Richmond | 251/30.03 |
| 5,203,538 | 4/1993 | Matsunaga et al. | 251/129.16 |
| 5,213,303 | 5/1993 | Walker | 251/45 |
| 5,277,167 | 1/1994 | DeLand et al. | 123/518 |
| 5,299,592 | 4/1994 | Swanson | 251/30.03 |
| 5,429,099 | 7/1995 | DeLand | 123/520 |
| 5,487,528 | 1/1996 | Richmond | 251/30.03 |
| 5,579,741 | 12/1996 | Cook et al. | 137/242 |

FOREIGN PATENT DOCUMENTS

| 0018182 | 2/1981 | Japan | 251/45 |
|---|---|---|---|

OTHER PUBLICATIONS

German Technical Publication XP002064094.

*Primary Examiner*—George L. Walton
*Attorney, Agent, or Firm*—Roger A. Johnston

[57] ABSTRACT

A diaphragm type flow regulator has an electrically operated bleed valve to control fluid signal pressure in a chamber on one side of the diaphragm. A valve member mounted on the opposite side of the diaphragm is moved, in response to the difference in pressure between the signal chamber and a flow regulating chamber, with respect to a valve seat for controlling flow of a compressible fluid between an inlet and outlet in the flow regulating chamber. An inertial mass is mounted for limited, resiliently opposed movement on the diaphragm, and serves to dampen diaphragm vibration caused by pressure pulses in the fluid supply conduit.

14 Claims, 2 Drawing Sheets

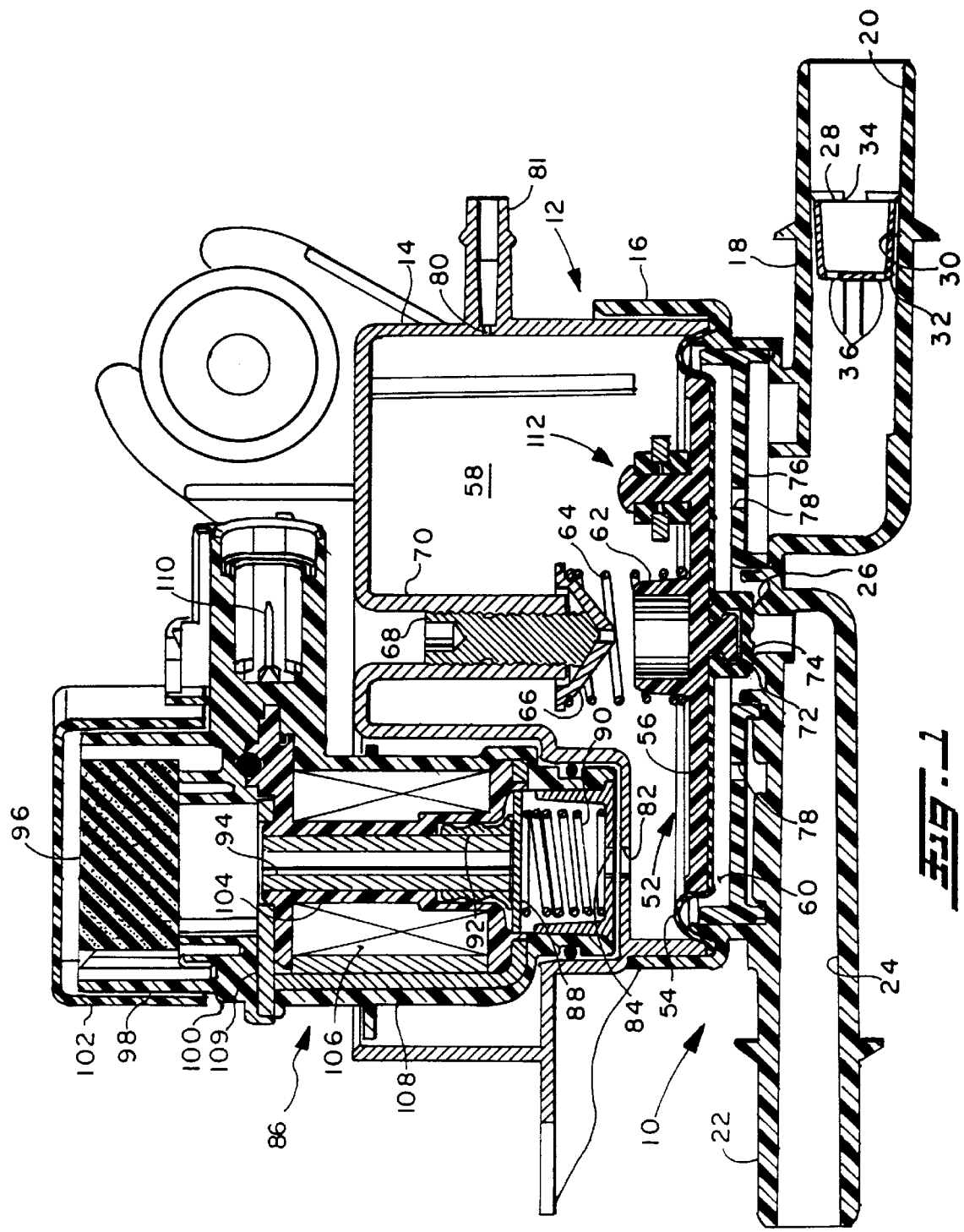

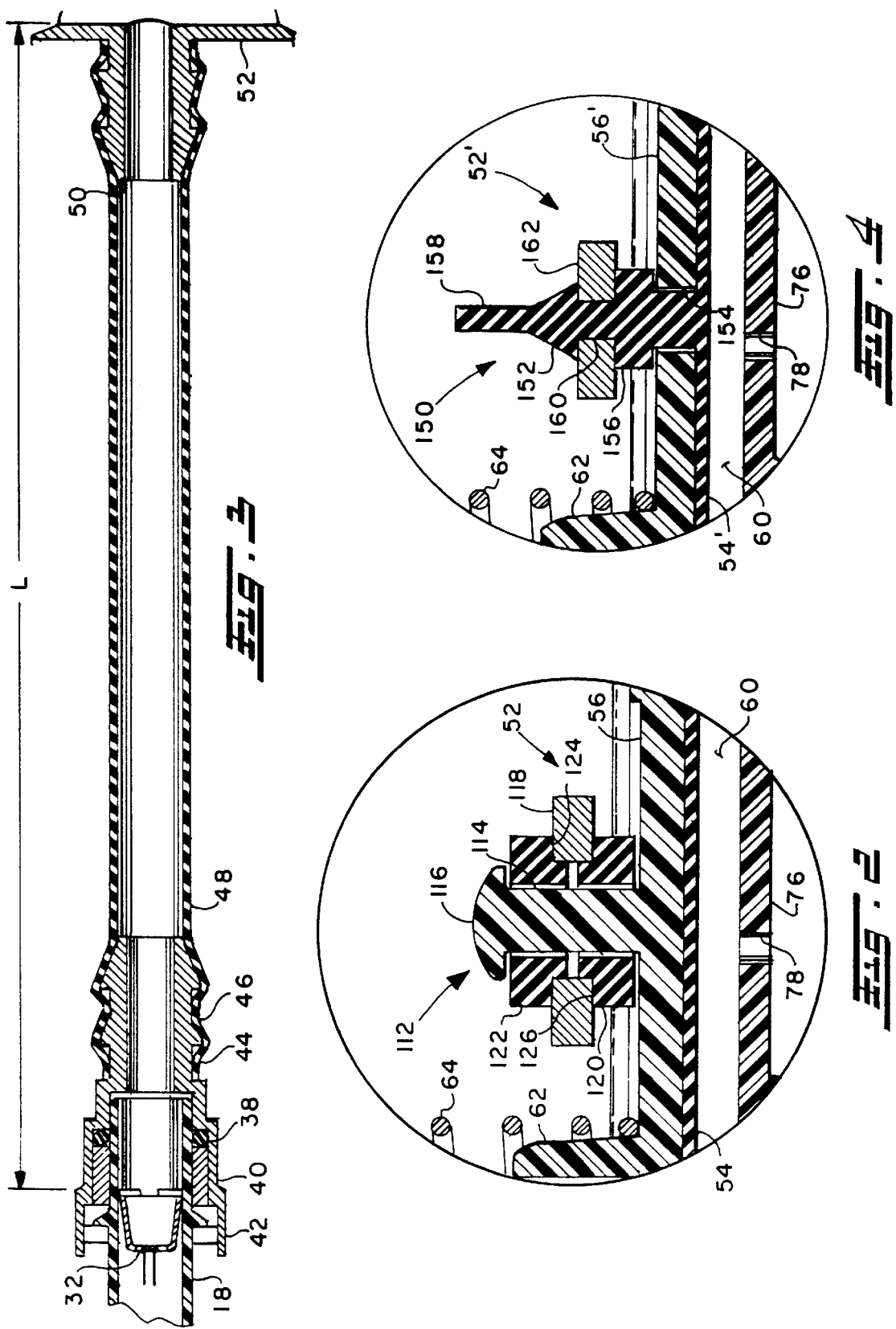

DAMPENING RESONANCE IN A FLOW REGULATOR

BACKGROUND OF THE INVENTION

The present invention relates to flow regulators and particularly flow regulators employed for compressible fluid flow control and more particularly relates to such regulators which are supplied with a fluid pressure signal which is modulated by an electrically remote controlled bleed valve for controlling the pressure applied to one side of a pressure responsive member. Regulators of this type typically have a moveable valve member attached to the opposite side of the pressure responsive member for controlling flow over a valve seat of the compressible fluid to be flow regulated.

Regulators of this type are utilized in motor vehicle fuel vapor emission control systems for controlling flow from a fuel vapor purge canister for communication with the charge air inlet of the vehicle engine. Purge control regulators of this type are known to utilize the engine manifold depression or vacuum as a fluid pressure signal source for the regulator.

In such known fuel vapor purge system flow regulators, problems have been experienced at certain levels of pressure in the vapor canister and at certain flow conditions in a connecting conduit between the canister and the flow regulator valve inlet. For a given length of conduit, pulses and rarefactions in the flow conduit have produced a standing wave which causes vibration of the pressure responsive member which in turn has produced a resonance in the conduit with the resultant tuning of the conduit. This resonating of the conduit between the fuel vapor canister and the regulator valve has produced an audible phenomenon known as "hooting" which is an undesirable noise in the system from the vehicle occupants' standpoint.

Thus, it has been desired to provide a way or means of dampening pressure pulsations or rarefactions in the inlet of a flow regulator and to provide such dampening in a way that is low in manufacturing costs and does not adversely affect the function or calibration of the flow regulator.

BRIEF SUMMARY OF THE INVENTION

It is an object of the present invention to provide a way of dampening pressure pulses and rarefactions in the inlet of a flow regulator of the type employing a pressure responsive member moveable in response to differential pressure thereacross for controlling movement of a flow regulating valve member.

It is a further object of the present invention to provide a way of dampening pressure pulsations in the inlet of a flow regulator having a pressure responsive member moveable in response to differential pressure thereacross for moving a flow regulating valve member with the pressure differential controlled by a remotely actuated electrically operated bleed valve for controlling fluid pressure on one side of the pressure responsive member.

It is a further object of the present invention to provide a flow regulator having a pressure responsive member moveable in response to a differential pressure thereacross for moving a flow regulating valve for controlling flow between the regulator inlet and an outlet with an inertial mass connected for limited relative movement with respect to the pressure responsive member.

The present invention provides a solution to the above-described problem and has a pressure responsive member in the form of a flexible diaphragm dividing a housing into a fluid pressure signal chamber and a fluid pressure flow regulating chamber with the pressure in the signal chamber controlled by an electrically operated bleed valve with the signal chamber connected to a source of fluid pressure which may in an automotive fuel vapor purge system be subatmospheric such as engine inlet manifold depression. The flow regulating chamber side of the pressure responsive member includes a valve member moveable with respect to a valve seat for controlling flow between an inlet and outlet of the flow regulator chamber, with the movement of the valve member determined by the differential pressure between the signal chamber and the flow regulating chamber acting upon the pressure responsive member. The pressure responsive member has an inertial mass associated therewith for limited relative movement with respect to the pressure responsive member which movement is resiliently resisted.

The present invention thus provides a flow regulator for controlling flow of compressible fluid, as for example, flow from a fuel vapor purge canister to an engine air inlet of the type which utilizes a pressure responsive member such as the piston or diaphragm with a fluid pressure signal control chamber on one side of the pressure responsive member and a flow regulating chamber on the opposite side of the pressure responsive member. The pressure in the fluid pressure signal chamber is controlled by supplying a fluid pressure signal thereto from a convenient source such as engine manifold depression and controlling atmospheric bleed to the chamber by means of an electrically operated bleed valve which may be controlled by a pulse modulated electrical control signal. The pressure responsive member has a valve attached thereto for controlling flow over a valve seat disposed between an inlet and outlet passage of the flow regulating chamber; and, the valve movement is dependent upon the differential pressure in between the two chamber acting across the pressure responsive member which has inertial member associated therewith biased for limited movement with respect thereto thereby damping pulsations of the pressure responsive member caused by pressure waves or pulses in the inlet to the regulating chamber.

BRIEF DESCRIPTION OF THE DRAWINGS

FIG. 1 is a cross-section of the flow regulator of the present invention;

FIG. 2 is an enlarged view of a portion of FIG. 1;

FIG. 3 is a sectional view of the supply tube connected to the flow regulator inlet of the embodiment of FIG. 1; and, FIG. 4 is an enlarged similar to FIG. 2 of an alternate embodiment of the invention.

DETAILED DESCRIPTION OF THE INVENTION

Referring to FIGS. 1 and 3, the flow regulator of the present invention is indicated generally at 10 and has a housing indicated generally at 12 which includes an upper housing shell 14 attached to a lower housing shell 16 which includes an inlet fitting 18 defining therein an inlet passage 20 and an outlet fitting 22 which defines an outlet or discharge passage 24 which communicates with a valve seat 26. Inlet passage 20 has disposed therein a restrictor which has a plurality of radially extending grooves or slots 28 formed therein which communicate with an annular passage 30 which is defined by press fitting the restrictor member 32 into the passage 20. Restrictor 32 also has a central aperture 34 at its inlet end which communicates with a plurality of smaller apertures 36 provided at the outlet end thereof.

Referring to FIG. 3, a typical application of the invention to an automotive fuel vapor purge system is shown, wherein inlet fitting 18 has an annular seal 38 received thereover and a backup support ring 40 provided adjacent thereto with an adaptor fitting 42 received thereover. Fitting 42 preferably has a plurality of annular barbs 44, 46 provided adjacent the right hand end thereof. The barbs 44, 46 have received thereover one end of a flexible supply tube or hose 48 with the opposite end of the hose 48 received over a similarly barbed fitting 50 provided on the wall of a supply source such as a fuel vapor purge canister 52. It will be understood that the effective length of the hose denoted by reference character L in FIG. 3, i.e., the distance between restrictor 32 and the inner surface of the wall 52, is subject to standing waves as a result of pressure pulses in the supply system. These standing waves over the length L can produce a resonance of the system within the regulator as will hereinafter be described.

Referring to FIG. 1, a pressure responsive means indicated generally at 52 includes a flexible diaphragm 54 preferably formed of elastomeric material and sealed about its periphery between the upper shell 14 and the lower shell 16 and a piston or backing plate member 56 disposed on the upper surface of the diaphragm 54. The piston 52 and diaphragm thus divide the housing 12 into an upper signal pressure chamber 58 and a lower fluid flow regulating pressure chamber 60.

The piston 56 has a tower or guide portion 62 provided centrally thereon which has received thereover one end of a preload spring 64, with the upper end of the spring registered against a seating washer 66 which is supported on the lower end of an adjustment screw threadedly received in a depending tubular portion 70 formed in the upper housing shell 14.

The piston 56 has a depending portion 72 over which is received a valve obturator 74 which is preferably integrally formed as one piece with the elastomeric diaphragm 54. The valving member or obturator 74 is operable to move with respect to stationary valve seat 26 and to seat thereupon in the closed condition.

The flow regulating chamber 60 has provided therein a flow dampener in the form of a disc-shaped member 76 which has provided therethrough a plurality of flow dampening orifices 78.

The pressure in fluid signal chamber 58 is controlled by a fluid pressure signal applied through inlet passage 80 formed in the wall of upper housing shell 14 and communicates exteriorly through a fitting 81 provided on housing shell 14. The fluid pressure signal provided at fitting 81 may be provided from any convenient source (not shown) such as, for example, by connection to an engine inlet manifold for the subatmospheric or vacuum pressure provided therein.

A port 82 is formed in the wall of housing shell 14; and, port 82 communicates with a corresponding port 84 provided at one end of an electrically operated valve indicated generally at 86. The valve 86 includes a magnetic armature plate 88 biased upwardly by a spring 90 to close against one end of a valve seat member 92 received over the end of a tubular pole piece 94 which communicates through a filter 96 with an annular outlet passage 98 provided between the upper end of valve body 100 and a protective cap 102.

Valve seat 92 is received in one end of a bobbin 104 which has wound thereabout a solenoid coil 106 which has thereover an L-shaped pole frame 108 capped with a washer 109 which are operative for conducting magnetic flux externally about the coil. Upon energization of the coil, tube 94 serves as an armature to move plate 88 toward valve seat 92 which reduces venting of the chamber 58 through port 82. Coil 106 is connected to terminal connectors such as connector 110 for external electrical connection thereto. In the present practice, valve 86 receives an electrical signal to control the opening of the valve to permit flow through bleed port 84 to control the pressure in chamber 58.

In the presently illustrated embodiments for an automotive fuel vapor purge application, signal port fitting 81 is connected to a source of subatmospheric pressure or vacuum such as the engine intake manifold. Signal orifice 80 controls the rate at which air within chamber 58 is evacuated through port fitting 81. Air is allowed to flow into chamber 58 through inlet ports 82 in the housing shell 14 and port 84 in the end of the electrically operated vacuum regulator 86 (EVR).

The EVR includes a magnetically permeable armature plate 88 biased upwardly by a spring 90 to close against one end of a non-magnetic valve seat 92. The magnetically permeable pole piece 94 is assembled into valve seat 92 to define a magnetic working air gap between the armature 88 and the pole piece 94. Valve seat 92 is pressed into the bore of bobbin 104. The upper side of armature 88 is thus exposed to atmospheric pressure through a central hole in pole piece 94, filter 96 and inlet passage 98.

With vacuum applied to signal port fitting 81 air will be evacuated from chamber 58. When the pressure differential applied to the armature 88 is sufficient to overcome the preload of spring 90, flow will be allowed between armature 88 and valve seat 92 thereby maintaining a bias vacuum within chamber 58. In one present automotive fuel vapor purge system application, a vacuum of 33 mm Hg is maintained in chamber 58.

When coil 106 is energized, armature 88 is magnetically attracted to pole piece 94. As the armature is moved closer to valve seat 92, flow of atmospheric air is restricted and a greater vacuum is drawn in chamber 58 before the pressure differential is enough to unseat armature 88 allowing subatmospheric air to flow into chamber 58. The current through coil 106 is thus controlled to control the vacuum in chamber 58.

Referring to FIGS. 1 and 2, the pressure responsive means 52 has an inertial dampening means indicated generally at 112 provided thereon to prevent vibration of the piston 56 from creating sufficient resonance so as to create a standing wave in the length L of the fluid supply hose 48 as to cause an audibly discernable acoustical phenomenon known as "hoot".

Referring to FIG. 2, inertial dampener 112 is shown as comprising a stanchion 114 formed integrally with piston 56 and extending upwardly therefrom with an expanded or mushroom-shaped head 116 formed on the upper end thereof An inertial mass 118 having an annular configuration is received over the stanchion 116 and is retained thereon by a pair of annular elastomeric support rings 120, 122 which are assembled by stretching over the head 116 of stanchion 114. Rings 120, 122 retain the annular mass 118 resiliently by engagement of annular groove 124 in ring 122 with the upper surface of the mass 118; and, by engagement of annular groove 126 formed in ring 120 with the lower surface of the inertial mass 118. The rings 122, 124 thus suspend the mass 118 vertically between the upper surface of piston 56 and the undersurface of the mushroom head 116 of stanchion 114.

In operation, any pulses transmitted to chamber 60 through the restrictor holes 78 which effect vibration of the pressure responsive means 52 are dampened by the vertical motion of the mass 118 relative to piston 56 against the resilient restraint of the elastomeric rings 120, 122 which results in a mass dampening of the vibration of the pressure responsive means 52, thereby eliminating formation of resonant waves in the supply hose 48.

Referring to FIG. 4, an alternate embodiment of the inertial dampener is indicated generally at 150 wherein the pressure responsive means 52' has diaphragm 54' with an integrally formed elastomeric stanchion 152 which extends upwardly through an aperture 154 formed in the piston 56'. The stanchion 152 has an enlarged diameter portion 156 which extends radially outwardly beyond the diameter of the aperture 154 substantially to limit or prevent relative motion of the diaphragm 54' with respect to the piston 56'. It will be understood that the stanchion 152 is assembled through the aperture 154 by stretching the elastomeric material with the aid of a reduced diameter pilot portion 158 which is inserted through aperture 154 and pulling of the larger diameter portion 156 through aperture 154.

Stanchion 152 has an annular groove 160 formed therein into which is received the annular inertial dampening mass 162 which is retained in the groove 160 by inserting the pilot portion of the stanchion 158 through the center aperture of the annular mass 162 and stretching the stanchion 152 and pulling it through the aperture of mass 162. In operation, the inertial dampener 150 of FIG. 4 functions identically as the inertial dampener 112 of FIG. 2.

The present invention thus provides a unique and novel technique for eliminating resonance in the fluid supply tube of a flow regulator employing a pressure responsive piston or diaphragm by providing a resiliently mounted inertial dampening mass on the pressure responsive piston or diaphragm which is effective to dampen out pressure pulsations in the flow regulating chamber.

Although the present invention has hereinabove been described with respect to the illustrated embodiments, it will be understood that the invention is capable of modification and variation and is limited only by the following claims.

We claim:

1. A resonance dampened compressible fluid flow regulator comprising:
   (a) housing structure including a pressure responsive member dividing said structure into a first fluid pressure chamber on one side of said member and a second fluid pressure chamber on the opposite side of said member said pressure responsive member including a piston moveable therewith, said housing structure including a fluid pressure signal port in said first chamber said signal port adapted for connection to a fluid pressure signal source; said housing structure including a bleed port communicating said first chamber with the ambient atmosphere;
   (b) a bleed valve selectively operable for controlling flow through said bleed port;
   (c) said housing structure including a fluid flow inlet port communicating with said second chamber, said inlet port adapted for connection to a source of fluid flow to be regulated;
   (d) means for controlling flow from said second chamber through an exhaust port in said second chamber responsive to the pressure difference between said first and second chamber, said means including a valve obturator connected to said pressure responsive member for movement therewith and a valve seating surface; and,
   (e) an inertial mass and resilient means for attaching said mass to at least a portion of said pressure responsive member for limited relative movement with respect to said piston, wherein said resilient means for attaching is operative to resiliently resist said limited relative movement wherein said inertial mass is operative to mass dampen the vibration of said pressure responsive member in response to pressure pulses and rarefactions experienced in said second chamber independently of the position of said pressure responsive member chamber.

2. The regulator defined in claim 1, wherein said bleed valve is electrically actuated.

3. The regulator defined in claim 1, wherein said first fluid pressure chamber is a vacuum chamber.

4. The regulator defined in claim 1, wherein said bleed valve is an electrically actuated valve adapted for control by a pulse width modulated signal.

5. The regulator defined in claim 1, wherein said obturator is an elastomeric member attached to said pressure responsive member.

6. The regulator defined in claim 1, wherein said housing structure includes means biasing said pressure responsive member in a direction to oppose the pressure forces of a subatmospheric pressure in said first chamber.

7. The regulator defined in claim 1, wherein said pressure responsive member comprises a flexible diaphragm.

8. The regulator defined in claim 1, wherein said inertial mass comprises an annular member elastically mounted on said pressure responsive member.

9. The regulator defined in claim 1, wherein said pressure responsive member comprises an elastomeric diaphragm having an integrally formed stanchion thereon; and, said inertial mass comprises an annular member mounted on said stanchion.

10. A method of dampening resonance in a compressible fluid flow regulator comprising:
    (a) providing a moveable pressure responsive member and forming a fluid pressure control chamber on one side thereof and forming a flow control pressure chamber on the side opposite said one side;
    (b) connecting a fluid pressure signal source to said control chamber and controlling the pressure in said control chamber;
    (c) connecting said flow control chamber to a source of compressible fluid to be flow regulated and porting said flow control chamber to a flow discharge line and moving an obturator connected to said pressure responsive member and valving said porting; and,
    (d) resiliently attaching an inertial mass to at least a portion of said pressure responsive member and permitting limited movement of said mass with respect to said member and inertially dampening said pressure responsive member in response to pressure pulses and rarefactions experienced in said flow control chamber, independently of the position of said pressure responsive member.

11. The method defined in claim 10, wherein said step of elastically attaching includes forming an elastomeric diaphragm and forming integrally therewith an elastomeric stanchion and mounting an annular mass thereon.

12. The method defined in claim 10, wherein said step of controlling includes electrically valving said control pressure chamber in response to an electrical control signal.

13. The method defined in claim 10, wherein said step of controlling includes pulsing an electrically operated valve.

14. The method defined in claim 10, wherein said step of resiliently attaching includes permitting limited relative movement between said mass and said pressure responsive member and elastically resisting said relative movement.

* * * * *